US011969940B2

(12) United States Patent
Soshi

(10) Patent No.: US 11,969,940 B2
(45) Date of Patent: Apr. 30, 2024

(54) ADDITIVE MANUFACTURING APPARATUS

(71) Applicants: DMG MORI CO., LTD., Nara (JP); ADVANCED RESEARCH FOR MANUFACTURING SYSTEMS, LLC, Woodland, CA (US)

(72) Inventor: Masakazu Soshi, Woodland, CA (US)

(73) Assignees: DMG MORI CO., LTD., Nara (JP); ADVANCED RESEARCH FOR MANUFACTURING SYSTEMS, LLC

( * ) Notice: Subject to any disclaimer, the term of this patent is extended or adjusted under 35 U.S.C. 154(b) by 1068 days.

(21) Appl. No.: 16/561,361

(22) Filed: Sep. 5, 2019

(65) Prior Publication Data

US 2020/0079015 A1    Mar. 12, 2020

(30) Foreign Application Priority Data

Sep. 6, 2018    (JP) ................................. 2018-166576

(51) Int. Cl.
*B29C 64/357*    (2017.01)
*B22F 10/25*    (2021.01)
(Continued)

(52) U.S. Cl.
CPC ............ *B29C 64/209* (2017.08); *B22F 10/25* (2021.01); *B22F 10/322* (2021.01); *B22F 10/73* (2021.01);
(Continued)

(58) Field of Classification Search
CPC .. B22F 3/00; B22F 10/73; B22F 12/50; B22F 12/52; B22F 12/53; B22F 12/70;
(Continued)

(56) References Cited

U.S. PATENT DOCUMENTS 5,487,624 A * 1/1996 Toyota .................. B05B 12/085
406/14
5,993,510 A * 11/1999 Edlinger ................. C21B 11/00
75/961

(Continued)

FOREIGN PATENT DOCUMENTS

JP    H09159597 A  *  6/1997
JP    2018086667 A     6/2018
(Continued)

*Primary Examiner* — Timothy Kennedy
(74) *Attorney, Agent, or Firm* — von Briesen & Roper, s.c.

(57) ABSTRACT

An additive manufacturing apparatus includes a nozzle body discharging a powder and a carrier gas from an opening, a powder supply supplying the powder and the carrier gas to the nozzle body, a flow rate adjuster provided in a supply path of the powder supply to cause a part of a flow of the carrier gas containing the powder to flow into a branch flow path branching from the supply path to adjust a flow rate of the carrier gas containing the powder to be supplied to the nozzle body, and the branch flow path connected to the flow rate adjuster. The branch flow path is connected to a flow path leading to the nozzle body and has a separator for separating the powder and the carrier gas. The carrier gas separated from the powder by the separator is supplied to the nozzle body through the branch flow path.

10 Claims, 3 Drawing Sheets

(51) Int. Cl.
   *B22F 10/322* (2021.01)
   *B22F 10/73* (2021.01)
   *B22F 12/50* (2021.01)
   *B22F 12/53* (2021.01)
   *B22F 12/57* (2021.01)
   *B22F 12/70* (2021.01)
   *B29C 64/209* (2017.01)
   *B33Y 30/00* (2015.01)

(52) U.S. Cl.
   CPC .............. *B22F 12/50* (2021.01); *B22F 12/53* (2021.01); *B22F 12/57* (2021.01); *B22F 12/70* (2021.01); *B29C 64/357* (2017.08); *B33Y 30/00* (2014.12)

(58) Field of Classification Search
   CPC ........ B22F 12/73; B22F 10/77; B22F 10/322; B33Y 30/00; B29C 64/20–295; B29C 64/30–393; B29C 64/357
   See application file for complete search history.

(56) References Cited

U.S. PATENT DOCUMENTS

| | | | |
|---|---|---|---|
| 6,257,447 B1 * | 7/2001 | Schlienger | G05D 7/0605 222/161 |
| 10,226,917 B2 * | 3/2019 | Hyatt | B33Y 40/00 |
| 10,850,350 B2 * | 12/2020 | Obara | B23K 26/0665 |
| 2012/0145683 A1 * | 6/2012 | Miyagi | B23K 26/144 219/121.64 |
| 2017/0028631 A1 * | 2/2017 | Hyatt | B22F 10/73 |
| 2018/0093347 A1 * | 4/2018 | Obara | C23C 4/123 |
| 2019/0143602 A1 * | 5/2019 | Diller | B33Y 30/00 264/482 |
| 2020/0164467 A1 * | 5/2020 | Cadoux | B29C 64/371 |
| 2020/0262148 A1 * | 8/2020 | Sebal | B29C 64/343 |
| 2021/0205928 A1 * | 7/2021 | Beeby | B29C 64/153 |

FOREIGN PATENT DOCUMENTS

| | | | |
|---|---|---|---|
| WO | 2017158738 A1 | 9/2017 | |
| WO | WO-2019063728 A1 * | 4/2019 | .............. B01F 15/04 |
| WO | WO-2019081894 A1 * | 5/2019 | .............. B22F 10/28 |

* cited by examiner

ADDITIVE MANUFACTURING APPARATUS

FIELD OF THE DISCLOSURE

The present disclosure relates to an additive manufacturing apparatus which manufactures a desired build object by supplying a powder to a machining position to form deposits there.

BACKGROUND OF THE DISCLOSURE

A well-known example of an additive manufacturing apparatus as mentioned above is a laser machining apparatus as disclosed in Japanese Unexamined Patent Application Publication No. 2018-86667. This laser machining apparatus includes a laser beam radiating head radiating a laser beam onto an appropriate table and is configured to supply a powder as an additive material along with a carrier gas to a laser-beam concentration spot (laser-beam focusing area) where the laser beam radiated by the laser beam radiating head is concentrated. When the powder is supplied to the laser-beam concentration spot, the powder is heated and melted by the energy of the laser beam and deposits there. This machining phenomenon is generally called "additive machining".

A supply nozzle for discharging the carrier gas containing the powder is disposed near the laser beam radiating head. The powder is supplied to the laser-beam concentration spot from the supply nozzle after flowing through a supply path that is connected at one end to an appropriate supply source storing the powder and the carrier gas and is connected at the other end to the supply nozzle.

At least one of the laser beam radiating head and the table is driven by an appropriate feed apparatus so that they are moved relative to each other in a three-dimensional space. This relative movement allows a deposit having a predetermined shape to be formed. Note that the supply nozzle, together with the laser beam radiating head, moves relative to the table.

By the way, at the time of starting the relative movement of the laser beam radiating head and supply nozzle and the table that is carried out by the feed apparatus, the relative movement is accelerated from the stopped state and then maintained at a constant speed. At the time of stopping the relative movement, the relative movement is decelerated from the constant-speed state and then stopped. Further, the direction of the relative movement is changed in relation to formation of deposits. At the time of changing the direction of the relative movement, the relative movement may be decelerated from the constant-speed state before the change and accelerated after the change.

Where the relative moving speed (hereinafter, simply referred to as "moving speed") of the supply nozzle is varied as described above, if the rate of discharge of the powder from the supply nozzle is constant, the rate (amount) of supply of the powder to the machining position set on the table (i.e., a position to which the powder is supplied; this position changes from moment to moment in parallel with the movement of the supply nozzle) is changed, which causes the problem that a resultant deposit does not form into an intended shape.

Therefore, attempts have been made to adjust the powder supply rate in accordance with the moving speed of the supply nozzle so that the ratio of the moving speed of the supply nozzle and the powder supply rate is constant, taking into account the case where the moving speed of the supply nozzle is changed. A method for adjusting the powder supply rate has been proposed in which a so-called three-way valve (three-way switching valve) is provided in the powder supply path near the supply nozzle to divide the flow of the carrier gas containing the powder into two flows, one directed to the supply nozzle and the other returned to the supply source, and adjust openness of each flow path of the three-way valve, thereby adjusting the flow rates of the flow directed to the supply nozzle and the flow returned to the supply source, i.e., adjusting the rate (amount) of supply of the powder to the supply nozzle. Note that the reason for providing the three-way valve near the supply nozzle is that providing the three-way valve far away from the supply nozzle causes a response lag in variation of the rate of supply of the powder to the supply nozzle and such a response lag prevents the powder supply rate from being adjusted appropriately in accordance with the moving speed of the supply nozzle.

SUMMARY OF THE DISCLOSURE

However, the above-described conventional method in which a three-way valve is provided in the powder supply path to divide the flow of the carrier gas containing the powder into two flows, one directed to the supply nozzle and the other returned to the supply source, has the problem as descried below.

That is to say, the carrier gas functions to carry the powder through the powder supply path and also functions to prevent oxidation of deposits at the laser-beam concentration spot (additive machining position) by shielding the additive machining position from outside atmosphere during an additive machining operation in which the powder is heated and melted and deposits there. The reason for preventing oxidation of deposits is that oxidation of deposited materials causes the quality of material of a resultant manufacture to differ from the intended one, which leads to the problems in the properties and strength of the manufacture.

However, where a part of the flow of the carrier gas containing the powder is returned to the supply source by the above-described three-way valve, as a matter of course, the amount of supply of the carrier gas to the additive machining position is reduced, and therefore oxidization of deposited materials at the additive machining position cannot be sufficiently prevented.

The present disclosure has been achieved in view of the above-described circumstances, and an object thereof is to provide an additive manufacturing apparatus which is able to keep an amount of supply of a carrier gas to an additive machining position constant while adjusting a rate of supply of a powder in accordance with a moving speed to a supply nozzle.

The present disclosure, for solving the above-described problems, relates to an additive manufacturing apparatus, including:

a nozzle body provided in a predetermined machining area and configured to discharge a powder and a carrier gas from an opening;

a powder supply connected to the nozzle body and configured to supply the powder and the carrier gas through a supply path leading to the opening of the nozzle body;

a flow rate adjuster provided in the supply path of the powder supply and configured to cause a part of a flow of the carrier gas containing the powder to flow into a branch flow path branching from the supply path to adjust a flow rate of the carrier gas containing the powder to be supplied to the nozzle body; and the branch flow path connected to the flow rate adjuster, the branch flow path being connected to a flow path leading to the opening of the nozzle body, the branch flow path having a separator provided therein for separating the powder and the carrier gas, and the additive manufacturing apparatus being configured such that the carrier gas separated from the powder by the separator is supplied to the nozzle body through the branch flow path.

In the additive manufacturing apparatus according to the present disclosure, a carrier gas containing a powder (hereinafter, referred to as "fluid") is supplied from the powder supply to the nozzle body provided in a predetermined machining area, and the supplied fluid is discharged from the opening of the nozzle body. Note that the additive manufacturing apparatus according to the present disclosure can be any type of known apparatus which is capable of heating, melting, and depositing a powder, in other words, capable of additive machining, such as a laser machining apparatus.

The flow rate adjuster provided in the supply path causes a part of the fluid supplied from the powder supply to flow into the branch flow path branching from the supply path, thereby adjusting a flow rate of the fluid to be supplied to the nozzle body. The additive manufacturing apparatus generally includes a feed apparatus that moves a machining table provided in the machining area and the nozzle body relative to each other in a three-dimensional space. The speed of the relative movement of the machining table and the nozzle body is changed at the time of acceleration or deceleration and also changed in accordance with machining conditions. When the speed of the relative movement of the machining table and the nozzle body is changed, the flow rate adjuster adjusts the flow rate of the fluid to be supplied to the nozzle body in accordance with the relative movement speed. Hence, adjusting the flow rate of the fluid to be supplied to the nozzle body in this manner allows a resultant deposit to accurately have an intended shape.

On the other hand, the fluid caused to flow into the branch flow path by the flow rate adjuster is separated into the powder and the carrier gas by the separator provided in the branch flow path. The separated carrier gas is supplied to the nozzle body via (through) the branch flow path. Further, the carrier gas supplied to the nozzle body through the branch flow path is mixed with the fluid supplied to the nozzle body through the supply path, and the mixed fluid is discharged from the opening of the nozzle body.

Hence, the carrier gas is always supplied to the nozzle body and discharged from the opening of the nozzle body at a constant flow rate. Therefore, an additive machining position where deposits are formed by additive machining is always shielded from outside atmosphere by the carrier gas supplied at a constant flow rate. Consequently, oxidation of deposit materials at the additive machining position by outside atmosphere is efficiently prevented.

Note that it is preferred that the additive manufacturing apparatus according to the present disclosure is provided with a powder recovery unit for recovering the powder separated by the separator. Provision of the powder recovery unit enables the separated powder to be returned to the powder source for reuse, instead of being wasted.

Further, it is preferred that the separator has a cyclone type separation mechanism. The cyclone type separation mechanism does not require parts such as a filter; therefore it allows the powder and the carrier gas to be efficiently separated from each other at low cost.

Further, it is preferred that the branch flow path is connected via a backflow preventing member to the flow path leading to the opening of the nozzle body. In this configuration, the backflow preventing member prevents the fluid to be supplied to the nozzle body through the supply path from flowing back into the branch flow path.

With the present disclosure, the flow rate adjuster allows the flow rate of the fluid to be supplied to the nozzle body to be adjusted in accordance with the speed of the relative movement of the machining table and the nozzle body. Adjusting the flow rate of the fluid to be supplied to the nozzle body in this manner allows a resultant deposit to accurately have an intended shape.

Further, since the fluid caused to flow into the branch flow path by the flow rate adjuster is separated into the powder and the carrier gas by the separator and the separated carrier gas is supplied to the nozzle body through the branch flow path, the carrier gas is always supplied to the nozzle body at a constant flow rate and the additive machining position where deposits are formed is always shielded from outside atmosphere by the carrier gas supplied at a constant flow rate. Consequently, oxidation of deposited materials at the additive machining position by outside atmosphere is efficiently prevented.

DETAILED DESCRIPTION

Figure 1:
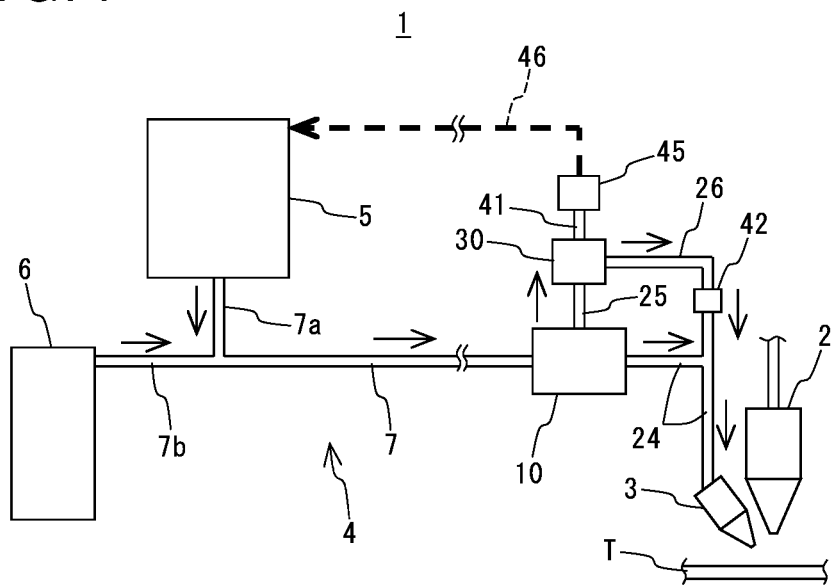
FIG. 1 is an illustration showing a schematic configuration of an additive manufacturing apparatus according to an embodiment of the present disclosure.

Hereinafter, a specific embodiment of the present disclosure will be described with reference to the drawings. An additive manufacturing apparatus 1 according to this embodiment is a laser machining apparatus as shown in FIG. 1. The additive manufacturing apparatus 1 includes a laser beam radiating head 2, a machining table T, a supply nozzle 3, a powder supply device 4, a flow rate adjustment device 10, and a separator 30.

The laser beam radiating head 2 is connected to a laser oscillator, which is not shown in the drawings. A laser beam is generated by the laser oscillator and transmitted to the laser beam radiating head 2 through an appropriate transmission path, and the laser beam radiating head 2 radiates the laser beam toward the machining table T so that the laser beam is concentrated on the machining table T.

The supply nozzle 3 is a nozzle body that discharges a carrier gas containing a powder as an additive material toward the laser-beam concentration spot ("laser-beam focusing area") on the machining table T where the laser beam radiated by the laser beam radiating head 2 is concentrated. When the powder is supplied to the laser-beam focusing area, the powder is heated and melted by the energy of the laser beam and deposits there so that a desired shape is created, i.e., additively machined.

Note that at least one of the laser beam radiating head 2 and the machining table T is driven by an appropriate feed apparatus so that they are moved relative to each other in a three-dimensional space, the feed apparatus being controlled by a numerical controller, which is not shown in the drawings. The numerically controlled feed apparatus can employ an appropriate, conventionally-known feed mechanism, for example, a ball screw mechanism which is driven by a servo motor. Note further that the supply nozzle 3 is attached to the laser beam radiating head 2; therefore, the supply nozzle 3 moves together with the laser beam radiating head 2.

The powder supply device 4 is composed of a powder tank 5, a gas tank 6, and supply pipes 7a, 7b, 7, 24, the supply pipes 7a, 7b, 7, 24 constituting a supply path. The powder tank 5 stores an appropriate metal powder to be used in the additive manufacturing apparatus (laser machining apparatus) 1 in this example, and the gas tank 6 stores argon gas as a carrier gas for carrying the metal powder. Note that, although a metal powder is used in this example, other kinds of powder may be used in conformity with the purpose of additive machining as appropriate. Note further that there is no particular limitation on the carrier gas as long as it is inert; other than argon gas, the carrier gas may be nitrogen gas, helium gas, or the like, or may be a gas mixture of such gases (inclusive of argon gas).

The powder tank 5 connects with the supply pipe 7a and the gas tank 6 connects with the supply pipe 7b, and the supply pipes 7a and 7b are connected to the supply pipe 7 that is connected to the flow rate adjustment device 10. The metal powder (hereinafter, simply referred to as "powder") supplied through the supply pipe 7a from the powder tank 5 is mixed with the carrier gas supplied through the supply pipe 7b from the gas tank 6, and the carrier gas with the powder mixed therein (hereinafter, referred to as "fluid") flows into the flow rate adjustment device 10 through the supply pipe 7.

The flow rate adjustment device 10 is provided before and near the supply nozzle 3 to distribute the fluid flowing into the flow rate adjustment device 10 through the supply pipe 7 to the supply pipe 24 leading to the supply nozzle 3 and a branch pipe 25 leading to the separator 30.

Figure 2:
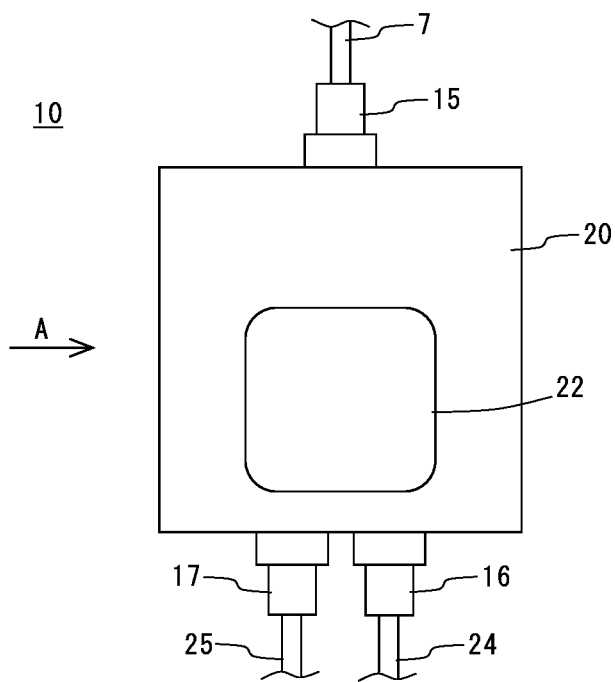
FIG. 2 is a front view of a flow rate adjuster according to the embodiment.
Figure 3:
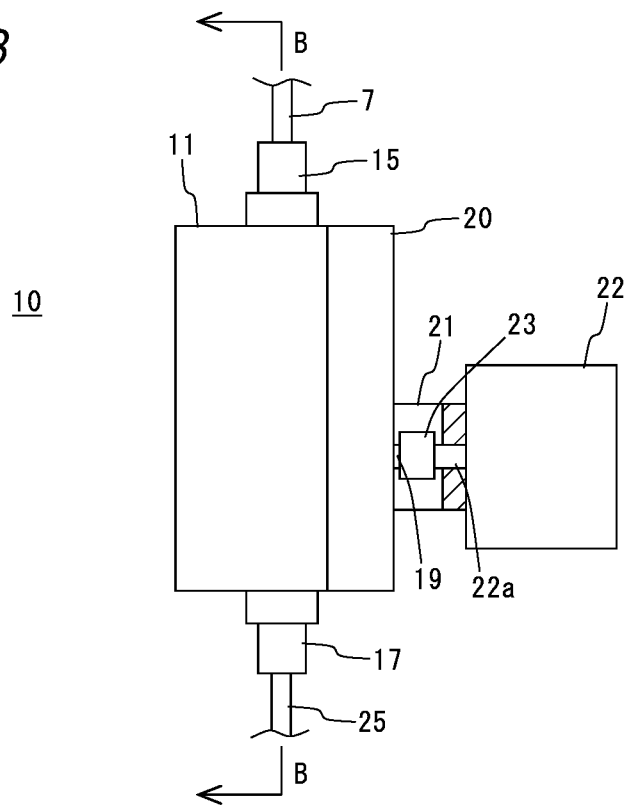
FIG. 3 is a side view of the flow rate adjuster as viewed in the direction of arrow A in FIG. 2.

As shown in FIGS. 2 and 3, the flow rate adjustment device 10 includes a body 11, a lid 20 joined to the body 11, and a servo motor 22 fixed to the lid 20 via a bracket 21.

Figure 4:
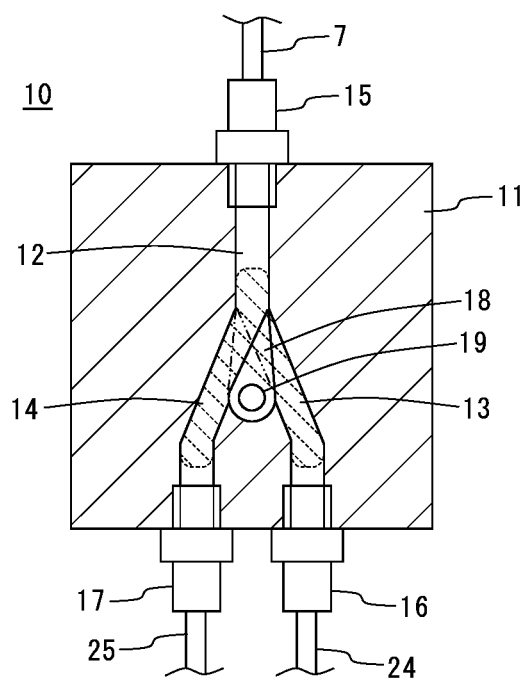
FIG. 4 is a sectional view taken along line B-B and viewed in the direction of allows B in FIG. 3.

The body 11 is composed of a block member having a prismatic shape, and has, as shown in FIG. 4, a first flow channel 12, a second flow channel 13, and a third flow channel 14 formed therein, the second and third flow channels 13 and 14 branching from the first flow channel 12. The first flow channel 12 has an opening in an upper surface of the body 11, and the second and third flow channels 13 and 14 have their respective openings in a lower surface of the body 11. A joint 15 is provided on the upper surface of the body 11 and the joint 15 connects with the opening of the first flow channel 12. The supply pipe 7 is connected to the joint 15. Further, a joint 16 and a joint 17 are provided on the lower surface of the body 11, and the joint 16 connects with the opening of the second flow channel 13 and the joint 17 connects with the opening of the third flow channel 14. The supply pipe 24 is connected to the joint 16, and the branch pipe 25, which constitutes a branch flow path, is connected to the joint 17.

Note that the broken-line hatched area in FIG. 4 represents groove-shaped areas of the first flow channel 12, second flow channel 13, and third flow channel 14 that are grooved from the lid 20 side in FIG. 3. The groove-shaped areas are sealed by the lid 20. Further, the portion of the first flow channel 12 other than the broken-line hatched area is formed by a circular hole that is bored from the upper surface of the body 11, and the portions of the second and third flow channel 13 and 14 other than the broken-line hatched area are each formed by a circular hole that is bored from the lower surface of the body 11.

At the fork where the first flow channel 12 divides into the two branches, an adjustment valve 18 is provided which pivots clockwise and counterclockwise about a pivot shaft 19 provided perpendicularly to the first flow channel 12. The adjustment valve 18 is composed of a beak-shaped member. When the adjustment valve 18 pivots clockwise as indicated by the solid line in FIG. 4 and the tip of the adjustment valve 18 is thereby brought into contact with a right-side inner surface of the first flow channel 12, the second flow channel 13 is closed and the first flow channel 12 is allowed to fully communicate with the third flow channel 14. On the other hand, when the adjustment valve 18 pivots counterclockwise as indicated by the dashed and double-dotted line in FIG. 4 and the tip of the adjustment valve 18 is thereby brought into contact with a left-side inner surface of the first flow channel 12, the third flow channel 14 is closed and the first flow channel 12 is allowed to fully communicate with the second flow channel 13. When the adjustment valve 18 is positioned at an intermediate position, openness between the first flow channel 12 and the second flow channel 13 and openness between the first flow channel 12 and the third flow channel 14 are determined by an angular position of the adjustment valve 18.

The pivot shaft 19 penetrates the lid 20 so that it extends outside. The end of the pivot shaft 19 is coupled to an output shaft 22a of the servo motor 22 via a coupling 23 so that the pivot shaft 19 is rotated by the servo motor 22. Note that the servo motor 22 is also controlled by the aforementioned numerical controller (not shown).

In the flow rate adjustment device 10, the fluid flowing through the supply pipe 7 flows into the first flow channel 12 through the joint 15, and the fluid having flowed into the first flow channel 12 is divided by the function of the adjustment valve 18 into a fluid flowing into the second flow channel 13 and a fluid flowing into the third flow channel 14. The flow rates of the fluid flowing into the second flow channel 13 and fluid flowing into the third flow channel 14 are dependent on the angular position of the adjustment valve 18, that is to say, they are determined by the openness between the first flow channel 12 and the second flow channel 13 and the openness between the first flow channel 12 and the third flow channel 14 that are determined by the angular position of the adjustment valve 18. The angular position of the adjustment valve 18 is controlled by the numerical controller (not shown). Therefore, the flow rates of the fluid flowing into the second flow channel 13 and fluid flowing into the third flow channel 14 are controlled by the numerical controller (not shown).

Figure 5:
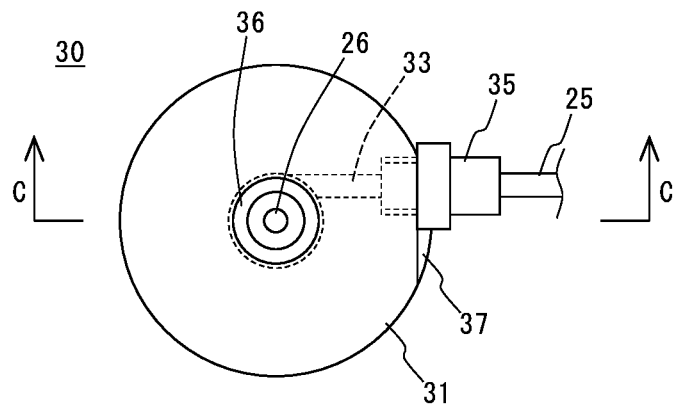
FIG. 5 is a plane view of a separator according to the embodiment.
Figure 6:
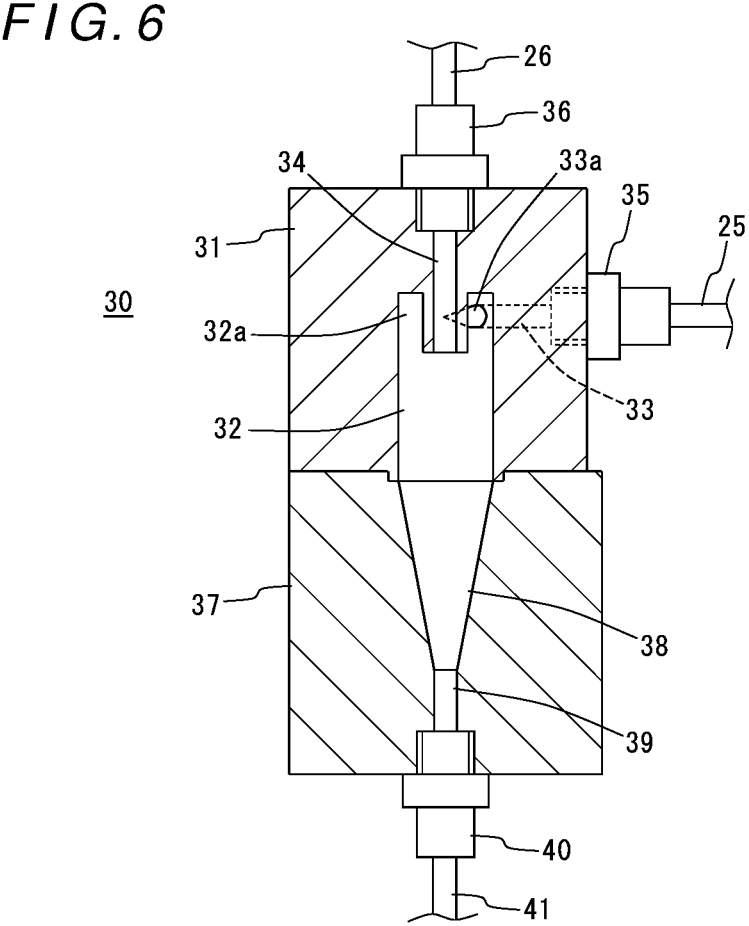
FIG. 6 is a sectional view taken along line C-C and views in the direction of arrows C in FIG. 5.

As shown in FIGS. 5 and 6, the separator 30 is the so-called cyclone separator that separates the powder and the carrier gas. The separator 30 is composed of a cylindrical upper body 31, a cylindrical lower body 37, and other components, the upper and lower bodies 31 and 32 being coupled together vertically. The upper body 31 has a cylindrical separation space 32 formed therein which has an opening in a lower surface of the upper body 31, an upper portion of the separation space 32 being formed in an annular shape. Further, the upper body 31 has a supply channel 33 formed therein which has an opening in an inner peripheral surface of the annular space 32a and an opening in an outer peripheral surface of the upper body 31. In FIG. 6, reference numeral 33a denotes the opening in the inner peripheral surface of the annular space 32a. A joint 35 connects with the opening in the outer peripheral surface of the upper body 31, and the branch pipe 25 is connected to the joint 35. Further, the upper body 31 has a discharge flow channel 34 formed therein which passes through the center of the upper body 31 vertically and has an opening in an upper surface of the upper body 31. A joint 36 connects with the opening of the discharge flow channel 34, and a branch pipe 26, which constitutes the branch flow path, is connected to the joint 36. Note that, as shown in FIG. 1, the branch pipe 26 is connected to the supply pipe 24 and has a backflow preventing member 42 provided at an intermediate position thereof.

The lower body 37 has a separation space 38 formed therein which has an opening in an upper surface of the lower body 37 and is formed to taper downwardly. The separation space 38 leads to a recovery flow channel 39 that is bored to have an opening in a lower surface of the lower body 37. A joint 40 connects with the opening of the recovery flow channel 39 in the lower surface of the lower body 37, and a recovery pipe 41 is connected to the joint 40. Note that the recovery pipe 41 is connected to a recovery box 45 which has a predetermined capacity.

In the separator 30, the fluid flowing into the branch pipe 25 from the flow rate adjustment device 10 flows into the annular space 32a through the supply channel 33. The fluid having flowed into the annular space 32a flows downward in the form of a turning flow which flows along inner peripheral surfaces of the separation spaces 32 and 37, and then the fluid is transformed from the downward-flowing turning flow into an upward-flowing rising flow at the bottom of the separation space 37. During this flowing process, the powder and the carrier gas are separated from each other. The separated powder is collected into the recovery box 45 through the joint 40 and the recovery pipe 41. On the other hand, the separated carrier gas flows upward in the form of the rising flow flowing through the centers of the separation spaces 37 and 32, and is discharged into the branch pipe 26 through the discharge flow channel 34 and the joint 36.

The recovery box 45 is connected to the powder tank 5 by an appropriate feeder 46. The powder collected into the recovery box 45 is returned to the powder tank 5 by the feeder 46.

In the additive manufacturing apparatus 1 according to this embodiment having the above-described configuration, a laser beam is transmitted from the laser oscillator (not shown) to the laser beam radiating head 2 through an appropriate transmission path, and the laser beam radiating head 2 radiates the transmitted laser beam toward the machining table T. The radiated laser beam is concentrated on the machining table T. On the other hand, the powder supplied through the supply pipe 7a from the powder tank 5 and the carrier gas supplied through the supply pipe 7b from the gas tank 6 are mixed together in the supply pipe 7, and the carrier gas with the powder mixed therein (fluid) is supplied to the supply nozzle 3. The fluid is discharged from the supply nozzle 3 toward the laser-beam concentration spot (laser-beam focusing area) on the machining table T, and the powder contained in the discharged fluid is heated and melted by the energy of the laser beam and deposits there (additive machining position).

The laser beam radiating head 2 and the machining table T are driven by an appropriate feed apparatus (not shown) under control by the numerical controller (not shown) so that they are moved relative to each other in a three-dimensional space. This relative movement allows an additive machining operation to be carried out on the machining table T such that a build object having a desired three-dimensional shape is created.

The amount of supply of the fluid to the supply nozzle 3 is adjusted by the flow rate adjustment device 10 under control by the numerical controller (not shown). That is to say, the servo motor 22 of the flow rate adjustment device 10 is controlled by the numerical controller (not shown); therefore, under control by the numerical controller (not shown), the flow rate adjustment device 10 causes the adjustment valve 18 to pivot to a commanded angular position. Thereby, the openness between the first flow channel 12 and the second flow channel 13 and the openness between the first flow channel 12 and the third flow channel 14 are adjusted on the basis of the angular position of the adjustment valve 18 so that the flow rates of the fluid flowing from the first flow channel 12 into the second flow channel 13 and fluid flowing from the first flow channel 12 into the third flow channel 14 are adjusted. One of the flow-rate-adjusted fluids is supplied to the supply nozzle 3 through the supply pipe 24 and the other flows into the separator 30 through the branch pipe 25.

As mentioned above, the speed of the relative movement of the laser beam radiating head 2 and the machining table T is changed when the movement is started, when the movement is stopped, or when the direction of the movement is changed, and such a change of the relative movement speed changes the moving speed of the supply nozzle 3 that is attached to the laser beam radiating head 2. If the rate of discharge of the powder from the supply nozzle 3 is constant, a change in the moving speed of the supply nozzle 3 changes the rate of supply of the powder to the machining position set on the machining table T, which causes the problem that a resultant deposit does not form into an intended shape.

With the additive manufacturing apparatus 1 according to this embodiment, the flow rate adjustment device 10 enables adjustment of the amount of supply of the fluid to the supply nozzle 3. Therefore, the amount of supply of the fluid to the supply nozzle 3 can be adjusted appropriately such that the ratio of the moving speed of the supply nozzle 3 and the rate of supply of the fluid to the supply nozzle 3 is substantially constant, which allows a resultant machining shape of the additive machining operation to accurately have an intended shape.

On the other hand, the fluid having flowed into the separator 30 through the branch pipe 25 is separated into the powder and the carrier gas by the separator 30, and the separated carrier gas flows into the supply pipe 24 through the branch pipe 26. The carrier gas having flowed into the supply pipe 24 through the branch pipe 26 is mixed into the fluid flowing through the supply pipe 24, and the fluid mixed with the carrier gas is supplied to the additive machining position on the machining table T. That is to say, the flow rate of the carrier gas supplied to the additive machining position where deposits are formed by additive machining is identical to that of the carrier gas before the fluid division by the flow rate adjustment device 10; therefore, the additive machining position is always shielded from outside atmosphere by the carrier gas supplied at a constant flow rate regardless of the fluid division by the flow rate adjustment device 10. Consequently, oxidation of deposited materials at the additive manufacturing position by outside atmosphere is effectively prevented.

Further, the additive manufacturing apparatus 1 according to this embodiment has the recovery box 45 into which the powder separated from the carrier gas by the separator 30 is collected, and the powder collected in the recovery box 45 is returned to the powder tank 5 by the appropriate feeder 46. Therefore, the separated powder can be returned to the powder source for reuse, instead of being wasted.

Further, the separator 30 has a cyclone type separation mechanism; therefore, it does not require parts such as a filter. Consequently, the powder and the carrier gas can be efficiently separated from each other at low cost.

Further, the branch pipe 26 has the backflow preventing member 42 provided therein; therefore, the fluid to be supplied to the supply nozzle 3 through the supply pipe 24 is prevented by the backflow preventing member 42 from flowing back into the branch pipe 26.

Hereinbefore, one embodiment of the present disclosure has been described. However, the present disclosure is not limited thereto and can be implemented in other modes.

For example, in the above embodiment, a laser machining apparatus is given as an example of the additive manufacturing apparatus 1. However, the additive manufacturing apparatus according to the present disclosure is not limited to such a laser machining apparatus, and examples thereof include all types of known apparatuses which are capable of heating, melting, and depositing a powder, in other words, capable of additive machining.

Further, the configuration of the flow rate adjustment device 10 described in the above embodiment is just an example. The flow rate adjustment device 10 is not limited to such a configuration and can have any configuration which is able to divide the fluid flowing through the supply pipe 7 into two fluids, one flowing into the supply pipe 14 and the other flowing into the branch pipe 25, so as to adjust the flow rates of them. Further, the separator 30 is also not limited to the configuration described in the above embodiment and can have any configuration which is able to separate the powder and the carrier gas.

As already mentioned above, the above description of the embodiments is illustrative in all aspects and is not limiting. One skilled in the art would be able to make variations and modifications as appropriate. The scope of the present disclosure is not defined by the above-described embodiments, but is defined by the appended claims. Further, the scope of the present disclosure encompasses changes made from the embodiments within the scope equivalent to the scope of the claims.

What is claimed is:

1. An additive manufacturing apparatus, comprising:
a nozzle body provided in a predetermined machining area and configured to discharge a powder and a carrier gas from an opening;
a powder supply having: a powder storage storing the powder; a gas storage storing the carrier gas; and a supply path connected to the nozzle body and leading to the opening of the nozzle body, the powder supply being configured to supply the powder stored in the powder storage and the carrier gas stored in the gas storage through the supply path;
a flow rate adjuster provided in the supply path of the powder supply and configured to cause a part of a flow of the carrier gas containing the powder to flow into a branch flow path branching from the supply path to adjust a flow rate of the carrier gas containing the powder to be supplied to the nozzle body; and
an upstream side of the branch flow path connected to the flow rate adjuster,
a downstream side of the branch flow path being connected, without going through the gas storage, to a confluence point on the supply path leading from the flow rate adjuster to the opening of the nozzle body between the flow rate adjuster and the nozzle body,
the branch flow path having a separator provided therein for separating the powder and the carrier gas, and
the additive manufacturing apparatus being configured such that the carrier gas separated from the powder by the separator is supplied to the nozzle body through the branch flow path connected to the separator.

2. The additive manufacturing apparatus of claim 1, comprising a powder recovery unit for recovering the powder separated by the separator.

3. The additive manufacturing apparatus of claim 1, wherein the separator has a cyclone separation mechanism.

4. The additive manufacturing apparatus of claim 2, wherein the separator has a cyclone separation mechanism.

5. The additive manufacturing apparatus of claim 1, wherein the branch flow path is connected via a backflow preventing member to a flow path leading to the opening of the nozzle body.

6. The additive manufacturing apparatus of claim 2, wherein the branch flow path is connected via a backflow preventing member to a flow path leading to the opening of the nozzle body.

7. The additive manufacturing apparatus of claim 3, wherein the branch flow path is connected via a backflow preventing member to a flow path leading to the opening of the nozzle body.

8. The additive manufacturing apparatus of claim 4, wherein the branch flow path is connected via a backflow preventing member to a flow path leading to the opening of the nozzle body.

9. The additive manufacturing apparatus of claim 1, wherein a flow rate of the carrier gas that flows in an upstream side of the flow rate adjuster is substantially same with a flow rate of the carrier gas downstream of the confluence point.

10. An additive manufacturing apparatus, comprising:
a nozzle body provided in a predetermined machining area and configured to discharge a mixture fluid of a powder and a carrier gas from an opening;
a gas storage storing the carrier gas;
a powder storage storing the powder;
a supply path that the mixture fluid flows, an upstream side of the supply path is connected to the gas storage and the powder storage and a downstream side of the supply path is connected to the nozzle body;
a bypass that branches from a branching point of the supply path and merges to a confluence point that is arranged at downstream side of the branching point in the supply path, the bypass is configured that a part of mixed gas that is a mixture of the carrier gas and the powder flows into from the supply path;
a flow rate adjuster configured to adjust a flow rate of the mixed gas that flows into the bypass from the branching point of the supply path;
a separator positioned in the bypass to receive the mixed gas that flows into the bypass, wherein the separator separates the mixed gas into separated powder and separated carrier gas and discharges the separated carrier gas to the confluence point for discharge from the nozzle body with the mixture fluid.

* * * * *